United States Patent [19]
Northcutt et al.

[11] 3,776,641
[45] Dec. 4, 1973

[54] OPTICAL DIVIDER POINT ASSEMBLY FOR HARMONIC SPECTRUM ANALYSIS

[75] Inventors: Marvin J. Northcutt; Eugene R. Roeschlein, both of Indianapolis, Ind.

[73] Assignee: The United States of America as represented by the Secretary of the Navy, Washington, D.C.

[22] Filed: Jan. 27, 1972

[21] Appl. No.: 221,248

[52] U.S. Cl. ..................... 356/171, 356/71, 356/77
[51] Int. Cl. .......................................... G01b 11/14
[58] Field of Search ................... 356/2, 3, 71, 77, 356/102, 171

[56] References Cited
UNITED STATES PATENTS
| | | | |
|---|---|---|---|
| 2,309,301 | 1/1943 | Burr | 356/77 |
| 2,773,415 | 12/1956 | Wolfe | 356/77 |
| 3,546,778 | 12/1970 | Lepowski | 356/171 X |
| 3,694,240 | 9/1972 | Miller et al. | 356/71 X |

FOREIGN PATENTS OR APPLICATIONS
| | | | |
|---|---|---|---|
| 1,296,388 | 5/1969 | Germany | 356/171 |

*Primary Examiner*—Ronald L. Wibert
*Assistant Examiner*—Paul K. Godwin
*Attorney*—R. S. Sciascia et al. and P. S. Collignon

[57] ABSTRACT

An optical divider point assembly for harmonic spectrum analysis having a cylindrical drum with one or more sets of spiral lines therearound, each set originating at a point and diverging in equal separation and rotatable within a housing having an elongated slot parallel to the drum axis to project reflected light from the spiral lines onto a supporting surface of frequency spectrums through a beam splitter plate to match the points of reflected light with frequency harmonics at the points of virtual image formation to identify same, the matched position being read out of a potentiometer position having its adjustable tap mechanically connected to rotate with the drum.

3 Claims, 4 Drawing Figures

PATENTED DEC 4 1973 3,776,641

OPTICAL DIVIDER POINT ASSEMBLY FOR HARMONIC SPECTRUM ANALYSIS

BACKGROUND OF THE INVENTION

This invention relates to spectrum analyzers and more particularly to an optical device for resting on a print-out of a frequency spectrum including their harmonics to produce a spread of reflected light dots to match and identify any fundamental frequency and several of its harmonics, each identity being read out in analog voltage.

Prior known devices were mechanical with an arrangement of knobs, gears, and drums with cable driven pointers over a supporting printout of a frequency spectrum to align the pointers with parallel lines on the printout. Such mechanical devices are costly and difficult to keep in adjustment to the performance levels required even though precision parts are used in production.

SUMMARY OF THE INVENTION

In the present invention a cylindrical drum has a series of lines emanating from a point source and diverging in equal spacing to a maximum separation producing a series of spirals that start from the same point and spread along an elongated window in a side of a housing for the cylinder. More than one set of such spirals may be placed on the drum for reflecting light through the housing slot. Additionally, a single spiral line traverses the cylindrical drum in one revolution to provide a single low frequency check line. The cylindrical drum is rotatable within the housing with the slot opening sufficient to overlay each set of spirals longitudinally of the housing. A beam splitter plate is immediately under the slot openings under which frequency charts may be placed to produce a spot of reflected light for each spiral line on the beam splitter plate. The supporting shaft of the cylindrical drum has a potentiometer shaft coupled thereto to provide an electrical readout for drum angular position. It is accordingly a general object of this invention to provide an optical means of analyzing low to high frequency spectrums and their harmonics with an analog readout voltage of a calibrated frequency range to identify frequency lines developed on charts read out of sonar, radar and other target receiving devices.

BRIEF DESCRIPTION OF THE DRAWINGS

These and other objects and the attendant advantages, features, and uses will become more apparent to those skilled in the art as a more detailed description proceeds when considered along with the accompanying drawing in which.

DESCRIPTION OF THE PREFERRED EMBODIMENT

Figure 1:
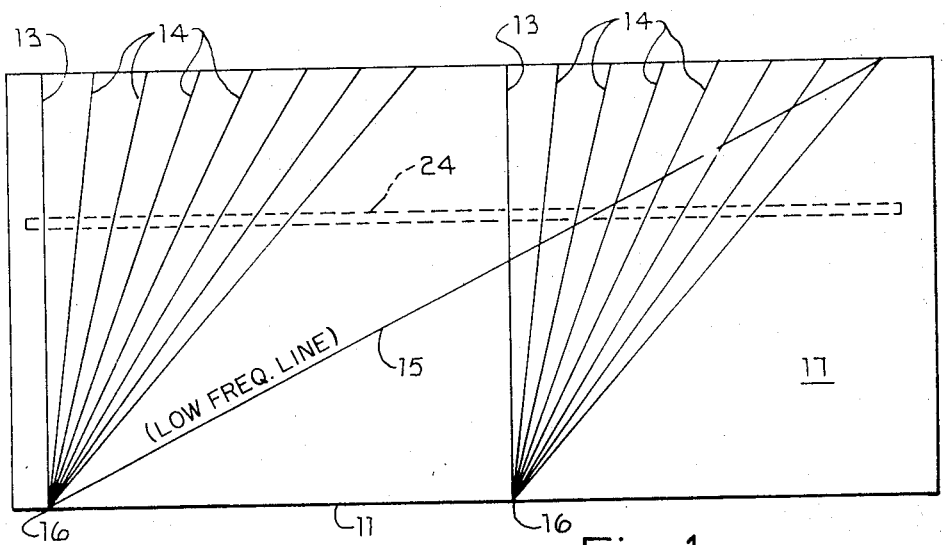
FIG. 1 is a plan layout of the surface of a frequency drum used in the invention.
Figure 2:
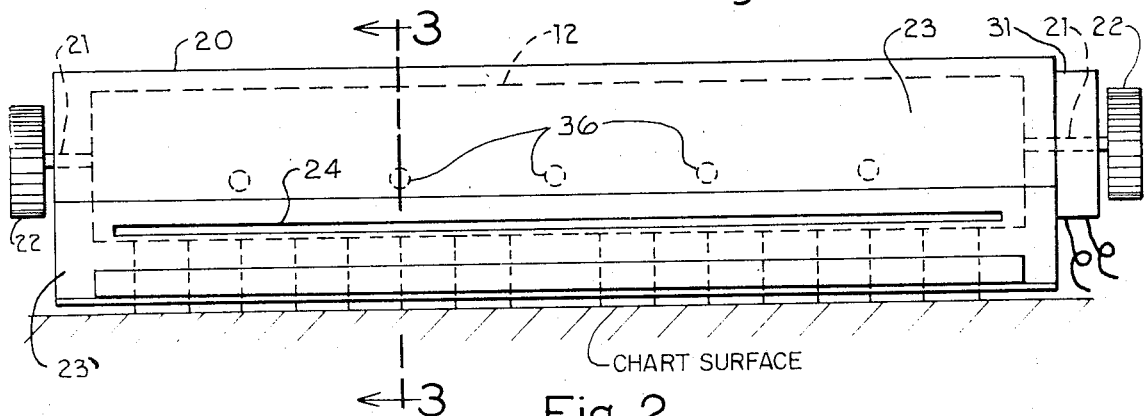
FIG. 2 is a front elevational view of the frequency analyzer of this invention.
Figure 3:
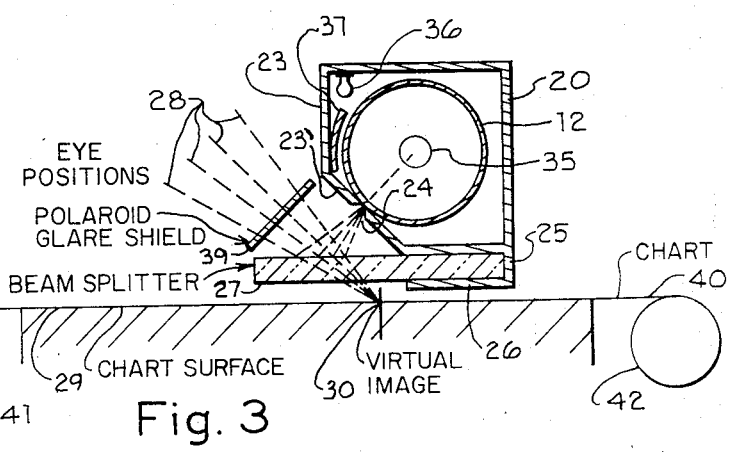
FIG. 3 is a cross-sectional view taken along the line 3—3 of FIG. 2.
Figure 4:
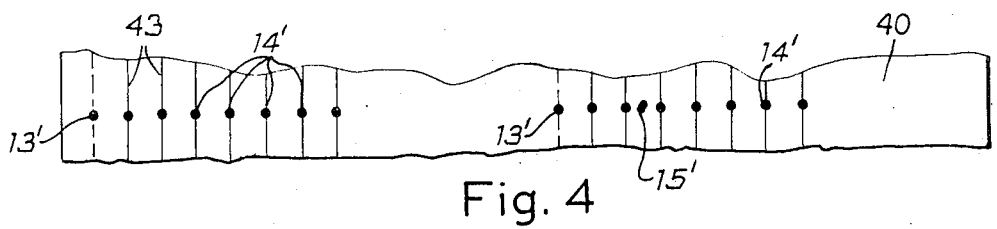
FIG. 4 illustrates one position of the virtual image of the dots produced by the analyzer.

Referring more particularly to FIG. 1 with occasional reference to FIGS. 2, 3, and 4, there is illustrated a flat plan layout 11 of the surface of cylindrical drum 12 as illustrated in FIGS. 2 and 3. The plan layout illustrated in 11 consists of vertical lines 13 and angularly disposed lines 14 all orginating at a point 16 on line 13, herein shown at the bottom edge of the plan layout 11. A single set of lines 13 and 14 may be used where desired but it is herein illustrated as having two sets of such lines 13 and 14 as originating at points 16 spaced along the plan layout. The lines 13 and 14 represent high frequency lines while a line 15 illustrates a low frequency line originating at the point 16 on the left and terminating at the terminating point of line 14 for the right hand set of lines. The plan layout 11 illustrates the plan layout around the cylindrical drum 12 as though the plan layout 11 were rolled around and fastened to the external surface of drum 12 with the upper and lower edges meeting. It is to be understood that such a plan output as 11 could be affixed to the external surface of the drum by a separate film or that such plan layout could be printed, scribed, scratched or in any suitable manner placed on the external surface of cylindrical drum 12. The field area 17 of the plan layout 11 is preferably black while the lines 13, 14, and 15 are of some light reflecting surface. It also may be preferable to make the lines 13 in some color as white, the lines 14 in a different color such as yellow, and the lines 15 in still a different color such as red, or the like, although these colors are selective by choice. The cylindrical drum 12 could be made of a plastic transparent material, a plastic opaque material, or a metallic material, such as aluminum, with the plan layout 11 placed or scribed thereon in any desirable manner such that all the lines 13, 14, and 15 will reflect light.

Referring more particularly to FIGS. 2 and 3, the cylindrical drum 12 is housed completely within a housing 20 and journaled by the shaft extensions 21 through the ends of the housing terminating in external knurled knobs 22 for manually rotating the cylindrical drum in the housing. Also to one of the shafts 21 is mechanically coupled the shaft of a potentiometer 31 which is capable of being driven throughout 360° to produce an electrical voltage output signal of varying amplitudes in accordance with cylindrical drum 12 position, as well understood by those skilled in the art. The housing 20 has a front face 23 which is bent inwardly and downwardly at 23'. The lower face 23' has an elongated slot 24 to extend longitudinally along the case and coextensive with the length of the cylindrical drum 12 to permit small dot portions of the lines 13, 14, and 15 to be seen on the surface of the cylindrical drum 12 within. The bottom side of the housing 20 has an extension 25 and lower supporting plate 26 to support a beam splitter plate 27 which extends forwardly under the angular face 23' of the housing to receive rays of reflected light through the slot 24 from the lines on the cylindrical drum 12. The beam splitter plate 27 is preferably partially silvered or otherwise made partially reflective so that ambient light will be reflected from the beam splitter plate 27 onto the surface 23' through the slot 24 to reflect light on the lines 13, 14, and 15 back to the plate as dots or spots and as viewed from eye positions 28. These dots or spots will appear as virtual images on a supporting surface 29 at points 30 and there will be no parallax between these dots and the frequency spectrum chart, since the distances from eye position 28 to the lines 13,14 is the same as from 28 to surface 29.

As more particularly referred to in FIG. 4 the reflected light from the cylindrical drum 12 to the virtual image points 30 along the supporting surface 29 will appear as virtual image spots of light 13', 14', and 15' on chart 40. These spots of light in FIG. 4 will be imaged from the drum through the slot 24 as shown positioned in FIG. 1. It should be readily understood that by rotating either knurled knob 22 the cylindrical drum 12 will be rotated so that the slot 24 could appear at any position from the bottom of plan layout 11 to the top thereby varying the spacing of the virtual image spots of light as shown in 14' from a single point at 13' which remains fixed. This drum 12 rotation equally spreads the virtual image dots 14' and 15' out to the limit as shown at the top of the plan layout 11.

The low frequency line will produce the virtual image dot 15' to originate only at the fixed dot 13' on the extreme left and will travel across the complete surface to the extreme right limit of the virtual image spot 14' of the right hand set of lines 13 and 14. The reference line is used in conjunction with equipment whose spectrum output is displayed wholly along the entire width of the chart 17 and not as two separate frequency bands.

It has been found that if any ambient light exists at all, it will be sufficient to reflect on the beam splitter plate 27 onto the portions of the lines 13, 14, and 15 in alignment with the slot 24 to be reflected back to the virtual image points 30 although other light sources may be used where the instrument is to be used in a darkened area. Ordinarily and for convenience the exterior surface of the housing 20 is black to make all virtual image dots to appear in bright contrast and the interior surface is black to minimize or eliminate reflections. If the cylindrical drum 12 were made of a transparent plastic, an internal light source, such as an incandescent tube or fluorescent tube 35, could be mounted centrally of the cylindrical drum 12 and lighted through slip rings. Where the cylindrical drum is made of an opaque material or a metal, light sources, such as small incandescent blubs 36, could be supported within the housing and the inner surface of the housing face 23 could be used to reflect the light from the lines 13, 14, and 15 through the open slot 24. A still further modification could be provided by an appropriately shaped plastic light conducting material 37, such as Lucite, to direct the light from the sources 36 to reflect the small portions of the lines 13, 14, and 15 through the slot 24. Further, the virtual image positions 30 could be viewed under conditions from the eye positions 28 through a polariod glare shield 39 whenever it is desirable or advisable to do so to reduce or minimize extraneous reflections.

The device above described is primarily used for the purpose of analyzing frequency spectrum charts having parallel lines thereon which are produced from sonar, radar, or other receiving equipment, which charts may be placed on the supporting surface 29 and the above-described instrument placed across the chart such that the virtual dots 13' and 14' may be spread to correspond with the fundamental frequency and its harmonics as represented by the parallel lines on the chart. Where a single low frequency is to be analyzed, the line 15 may be controlled to overlay the frequency to be analyzed by the virtual dot 15'. Where higher frequencies are to be analyzed the knobs 22 will be rotated to position the virtual dots 13' and 14' to overlay the frequency and harmonic positions. Ordinarily the virtual image dots 13' will be placed over the frequency chart representing the fundamental frequency and the virtual image dots 14' will be positioned over the harmonics. In this manner all frequencies encountered in the sonar or radar frequency print-out charts can be readily analyzed. A print-out frequency chart 40 having parallel lines 43 thereon may be placed on the supporting surface 29 and reeled and unreeled from the reels herein represented by 41 and 42. In this manner the chart can be run backward or forward on the reels and stopped at positions where the frequency analyzer can be used to analyze frequencies thereon by rotating either knob 22 and position the virtual image dots 13', 14', and 15' over the frequency spectrum lines 43 without any parallax and without any backlash due to drum adjustment.

While many modifications may be made in the constructional details, as in the use of light sources or in various mechanical couplings of the knurled knob 22 or mechanical coupling to the potentiometer 31, or the drum 12 may be replaced with other drums having other scales thereon, which are linear or non-linear to suit the circumstances of use, it is to be understood that we desire to be limited in the spirit of our invention only by the scope of the appended claims.

We claim:

1. An optical divider point assembly for harmonic spectrum analysis comprising:
    a cylindrical drum on a shaft having at least one line encircling said drum and a plurality of lines diverging in equal separation from a point on each said one line around said drum providing at least one set of spiral lines throughout 360°;
    a housing for said cylindrical drum journaling said shaft, said housing having a longitudinal slot in a lower side thereof under which said lines pass;
    a rotatable potentiometer having its movable contact mechanically coupled to said shaft to provide analog voltage readouts for all shaft and drum positions; and
    a beam splitting plate supported on said housing adjacent to said longitudinal slot to receive dots of light formed from the reflections of said lines through said slots on the top surface of said beam splitting plate forming virtual images whereby when supported on a frequency spectrum chart, the cylindrical drum shaft can be rotated to match the dots of reflected light from said lines as virtual images on the frequency spectrum chart on said beam splitting plate with parallel lines on said frequency spectrum chart representing fundamental and harmonics of frequencies to identify such frequencies to remote equipment by analog voltage readout of said potentiometer.

2. An optical divider as set forth in claim 1 wherein said shaft has knurled knobs on opposite shaft ends external of said housing for rotating said cylindrical drum manually.

3. An optical divider as set forth in claim 1 having a light within said housing.

* * * * *